United States Patent [19]

Bonham

[11] Patent Number: 5,271,338
[45] Date of Patent: Dec. 21, 1993

[54] TABLETOP APPARATUS AND METHOD OF CONSTRUCTION

[75] Inventor: Brent Bonham, Orem, Utah

[73] Assignee: Mity-Lite, Inc., Orem, Utah

[21] Appl. No.: 833,014

[22] Filed: Feb. 10, 1992

[51] Int. Cl.⁵ .................................. A47B 13/00
[52] U.S. Cl. .................................... 108/161
[58] Field of Search ............... 108/161, 1; 428/40, 428/500

[56] References Cited

U.S. PATENT DOCUMENTS

| | | | |
|---|---|---|---|
| 3,164,110 | 1/1965 | Bofinger | 108/161 |
| 3,610,175 | 10/1971 | Wilton et al. | 108/161 |
| 3,628,470 | 12/1971 | DeLuca | 108/161 X |
| 3,837,298 | 9/1974 | Leonhart | 108/161 |
| 4,337,107 | 6/1982 | Eshleman | 428/40 X |
| 4,689,257 | 8/1987 | Baum | 108/161 X |

Primary Examiner—Peter M. Cuomo
Assistant Examiner—Michael Milano
Attorney, Agent, or Firm—Thorpe, North & Western

[57] ABSTRACT

A lightweight and strong tabletop suitable for use with portable and/or collapsible tables comprises a support layer of thin laminated wood and a cover layer of ABS plastic continuously bonded to the support layer by pressing the cover layer and the support layer together with an adhesive comprising methylethylketone disposed between them. Suitable support beams are provided under the support layer, and a bottom protective layer is provided underneath the tabletop for appearance and durability. A plurality of legs support the tabletop.

2 Claims, 1 Drawing Sheet

TABLETOP APPARATUS AND METHOD OF CONSTRUCTION

FIELD OF THE INVENTION

The present invention concerns tables and tabletops, and particularly lightweight, portable, and/or collapsible tables, tops therefor, and methods of construction.

BACKGROUND OF THE INVENTION

Portable tables, usually collapsible, are used for convenient transport between different locations and for preparing locales for periodic activities ranging from banquets to card games. Such tables must be lightweight for easy lifting and moving but must at the same time approach or equal the strength of conventional, heavy, non-portable tables. Those portable tables which are sturdy and able to handle heavy loads are often cumbersome, heavy, and inconvenient to move, while those which are lightweight and easy to transport are often weak and unstable.

These tables must be attractive enough for use in a wide range of settings, and must be extremely durable. Frequent moving of the tables exposes them to considerable knocking about in harsh circumstances, which the tables must be able to withstand with a minimum of noticeable damage. They must be able to maintain their integrity and shape through wide temperature differences during both use and storage.

Examples of prior art tables include Morgan et al., U.S. Pat. No. 2,717,187, which discloses a tabletop comprising a relatively thick wood core having top and bottom crossbands of suitable veneer and upper and lower plastic sheets bonded to the core. Morgan et al. teaches that the lower plastic sheet is necessary to the proper functioning of the tabletop to balance stresses induced by the upper plastic sheet. A further layer of material is provided under the lower plastic sheet. Goodman, U.S. Pat. No. 2,216,171, O'Conner, U.S. Pat. No. 1,934,372, Campbell, U.S. Pat. No. 2,251,395, and Wagner, U.S. Pat. No. 1,544,289, each disclose a tabletop comprising a panel made of stiff material, such as wood, loosely covered with a flexible nonresilient material such as fabric, paper, or leather for appearance and protection of the wood.

It has been found that plastic or polymer tabletops satisfy many requirements of portable tables. They tend to retain a satisfactory appearance after considerable wear and tear, and they resist marking. However, without reinforcement either through internal fibers or additional layers of support material, an amorphous and isotropic plastic normally lacks sufficient strength. Additionally, since a plastic top tends to warp easily due to heat, as for example when a hot food item is placed upon it, the conventional wisdom in the art has been that a plastic cover with a reinforcing layer bonded beneath it must be stiffened or balanced in some way. For example, we have seen that Morgan et al. uses a bottom layer of plastic bonded to a thick wood core to "balance" the stresses of the top plastic layer.

Plastic covers over reinforcing layers often experience delamination from the reinforcing layers at high temperatures, destroying the strength and integrity of the tabletop. This has been true especially where the adjacent reinforcing layer is constructed of a heat insulating material such as wood.

OBJECTS AND SUMMARY OF THE INVENTION

It is therefore an object of the present invention to provide a tabletop suitable for use with portable and/or collapsible tables which overcomes the deficiencies of the prior art.

It is a further object of the invention to provide a tabletop which is lightweight while maintaining considerable strength and which is durable and damage-resistant.

It is a further object of the invention to provide a table having a plastic top which will maintain its shape and not separate from its reinforcing layer under extreme temperature differences.

It is a further object of the invention to provide a visually pleasing portable table.

In accordance with a first aspect of the invention, a tabletop comprises a thin cover having generally planar top and bottom surfaces, a thin wood support having a generally planar top surface of fibrous texture having approximately the same surface area as the bottom surface of the cover disposed such that the top surface of the support presses against the bottom surface of the cover, and an adhesive disposed between the bottom surface of the cover and the top surface of the support and within the fibrous texture for adhering the cover to the support through substantially their entire contacting surface areas.

In accordance with a second aspect of the invention, a method of constructing a tabletop comprises selecting a substantially planar sheet of plastic comprising at least one of the following materials: ABS plastic, polycarbonate, polystyrene, polyethylene. A substantially planar sheet of wood is the selected, and a thin layer of an adhesive comprising a solvent of the plastic sheet is placed on the top surface of the wood sheet. The plastic sheet is then quickly pressed against the top surface of the wood sheet.

Specifically, and in a preferred embodiment, a tabletop according to the invention comprises a substantially planar wood board having a top surface and a bottom surface, a substantially planar ABS plastic cover having a top surface and a bottom surface disposed such that its bottom surface faces the top surface of the board, and an adhesive comprising ABS plastic disposed between the board and the cover on substantially the entire surface areas thereof, acting to securely adhere the board to the cover. The adhesive may also comprise methylethylketone as a solvent.

BRIEF DESCRIPTION OF THE DRAWINGS

These and other objects, aspects, and advantages of the present invention will be apparent from the following description and attached drawing figures, of which.

DETAILED DESCRIPTION OF THE INVENTION

Figure 1:
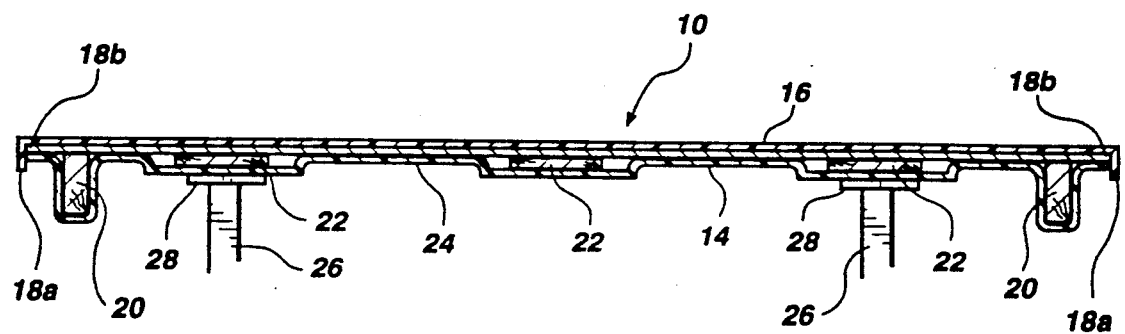
FIG. 1 is a side elevational view in cross-section of an example of a table according to the invention.
Figure 2:
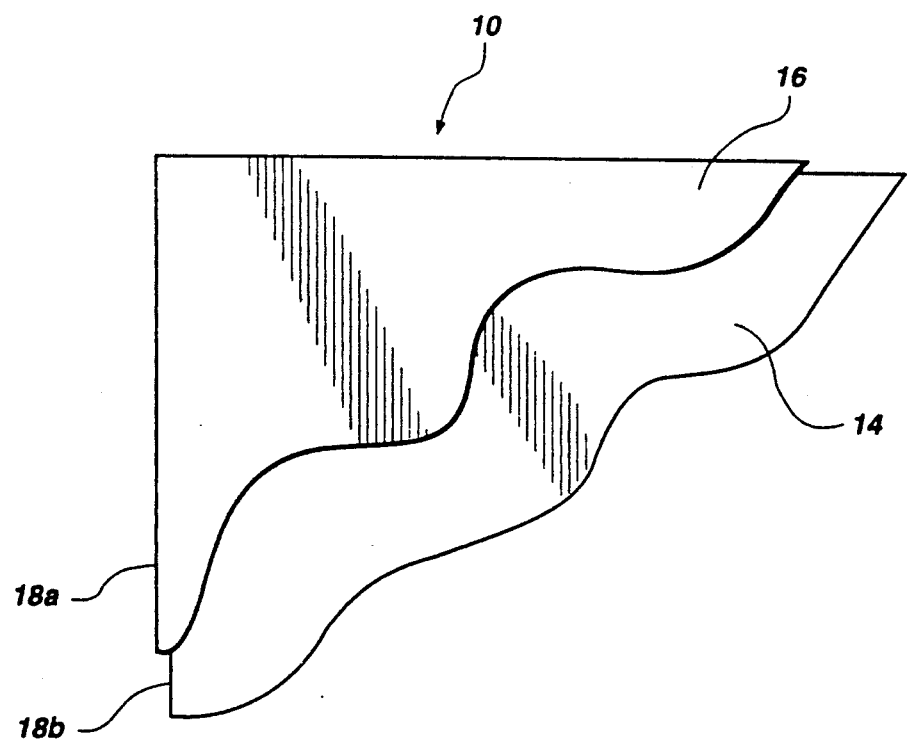
FIG. 2 is a partial top plan view of the table of FIG. 1.

Referring to the figures, a preferred embodiment of a table 10 according to the invention is shown. The top of the table comprises a rectangular wooden support layer 14 and a rectangular plastic cover layer 16 overlaying the support 14. (The layers 14, 16 can of course be made in other corresponding shapes.) The surface area of each of these layers approximates the other except that the cover 16 is slightly larger than the support 14 so that the edges 18a of the cover overlap and can be bent over the edges 18b of the support to enhance the appearance of the table and prevent separation of the layers through bumping or jarring the exposed edges 18a,b. One can alternatively configure the edges in any suitable way to satisfy durability and appearance requirements.

The wood support layer 14 can be made of any shape and size according to the desired size of tabletop. The support layer 14 is relatively thin, approximately ⅛ inches thick in the preferred embodiment. It may comprise a single layer of wood or material having similar properties of strength and weight, or may comprise a plurality of laminated sublayers as in, for example, conventional plywood. In the particular embodiment described, the support comprises a planar sheet of luan plywood having three wood sublayers with grains at cross-orientations. The edges of the support layer 14 are sanded or otherwise smoothed. This type of plywood is preferred because it is strong and inexpensive.

The cover layer 16 comprises a planar sheet of ABS plastic or similar material such as a polystyrene, a polycarbonate such as LEXAN, or a polyethylene. The material used in the cover 16 should be durable, attractive, and resistant to dents and warpage due to transport and temperature conditions. The material should minimize localized warpage due to hot objects such as food pots or serving dishes placed on its surface. It has been found that a layer approximately 1/16 thick of ABS plastic effectively meets these objectives.

The cover 16 is preferably textured on its top surface to minimize damage from scratching or marking. Its bottom surface is smooth to facilitate attachment to the support layer 14.

The preferred method of bonding the cover 16 to the support 14 is by applying a thin coat of an adhesive solution comprising ABS plastic dissolved in a solvent such as methylethylketone (if ABS plastic is used for the cover) to the top surface of the support layer 14. The proportion of ABS plastic in the solvent will depend on the size of the tabletop being constructed; the larger the tabletop, the more plastic should be used to keep the solvent from evaporating before the cover 16 can be placed on the support layer 14. Solvent alone can be used for smaller tables. It has been found that for conventional size tables, such as a standard dining room table, a proportion of 30% ABS in the solvent is satisfactory.

Very quickly after the adhesive solution is applied to the support layer 14, the cover 16 is pressed onto the support layer 14 a sufficient length of time to laminate the cover 16 to the support layer 14. In a preferred embodiment, after coating the support layer 14 of a conventional size table with 30% ABS solution, no more than approximately three seconds should elapse before pressing the cover to the support layer. The layers are pressed together at least fifty seconds, approximately, at a pressure of 12 pounds per square inch (allowing five seconds for the pressure to build up in the press). The cover 16 is now very effectively bonded to the support layer 14 with no curing time required (though the bond will continue to strengthen slightly as the solvent fumes escape over a period of approximately a month). Most other methods of lamination require lengthy curing times and high temperatures which slow the manufacturing process considerably.

It has been found that the described process results in extremely strong lamination bonds. By itself, ABS plastic has a heat tolerance of 130 degrees Fahrenheit before it begins to bubble and melt. It has been generally believed that an insulating reinforcing layer such as wood decreases the heat tolerance of the plastic. Contrary to expectations, however, the heat insulating wood support layer 14 in the present invention has been found to actually increase the heat tolerance of the plastic. In the described configuration, the plastic cover 16 is able to withstand temperatures in an approximate range of −30 to 210 degrees Fahrenheit. Even at temperatures past that limit with the plastic melting and boiling, the cover 16 does not delaminate from the support layer 14. It is believed that this excellent bonding exists because the cover 16 and the adhesive used to bond the cover 16 and support 14 together are made of the same material, thereby forming a type of mechanical bond to the wood since the adhesive essentially becomes part of the cover. The cover itself is therefore secured into the fibrous texture of the wood. In high temperatures, the adhesive cannot melt and delaminate the cover from the support since the adhesive in essence is the cover.

If a material other than ABS plastic is used for the cover 16, that material dissolved in an appropriate solvent (or the solvent alone for small surfaces) can in some cases be used as an adhesive to coat the support layer 14 before lamination. A suitable adhesive can be used in those cases in which solvent bonding is not difficult, such as if the cover comprises polyetheylene.

The type of lamination disclosed herein is contrary to conventional wisdom in the art, which dictates that an elastic barrier material be placed between the plastic cover and the wood support layer to accommodate the different expansion and contraction rates of the two materials. This has been found to be unnecessary. It is therefore possible that some types of epoxy or other adhesive could be used to similar bonding effect.

The relatively thin support layer lend considerable strength to the cover layer through its grain direction which would otherwise have to be obtained through a thick layer of fiber-reinforced polymer or other means. The thinness of the layers keeps the table light and easy to move. The result is a strong, lightweight, and durable tabletop that will maintain its structural integrity and shape over a long period of time and in adverse conditions and temperatures. The support layer also allows reduction of the more expensive material used for the cover 16, resulting in considerable savings.

Peripheral support beams 20, approximately ¾"×2¼" in the preferred embodiment, are secured perpendicularly to the bottom surface of the support layer 14 near the periphery thereof. Structural support beams 22, approximately ¾"×3¼" in the preferred embodiment, attach at their ends to the peripheral beams 20 and cross the width of the bottom surface of the support layer 14. The particular type and number of structural beams 22, as well as beams 20, may be varied according to the size and shape of the table.

A plastic bottom protective layer 24 approximately 1/32 inches thick in the preferred embodiment is molded to the shape of the bottom of the support layer 14 and attached support beams 20,22 and secured thereto. There is no need to secure the bottom protective layer 24 continuously, as the top cover layer 16, since the protective layer is provided merely for protection of the support layer and beams from dents, marks, or scratches. Nevertheless, the same process used to laminate the cover 16 to the support 14 can be used with regard to the protective layer 24, if desired. The bottom surface of the protective layer 24 is preferably textured in the same manner as the top surface of the cover 16 is textured.

Legs 26 supporting the table top are attached to the support beams 22 by any suitable means through the protective layer 24. Secondary supports 28 may be provided at the top of the legs if desired.

It will be appreciated that only one embodiment of the invention has been described, and that modifications and variations thereof will be apparent to those skilled in the art. The invention is not limited to the described embodiment; rather, it is defined by the following claims.

I claim:

1. A tabletop comprising:
   a thin cover layer having generally planar top and bottom surfaces;
   a thin support layer comprising naturally occurring wood material having a generally planar top surface of fibrous texture with approximately the same surface area as the bottom surface of the cover disposed such that the top surface of the support presses against the bottom surface of the cover;
   an adhesive disposed between the bottom surface of the cover and the top surface of the support and within the fibrous texture for adhering the cover to the support through substantially their entire surface areas; and
   a plurality of beams mounted to the bottom surface of the support and a protective bottom layer covering the beams and exposed bottom surface of the support, the protective layer being molded generally to the shape thereof.

2. The tabletop of claim 1 wherein the bottom layer is adhered to the beams and exposed bottom surface of the supporting by an adhesive comprising a solvent of the bottom layer material.

* * * * *

REEXAMINATION CERTIFICATE (4173rd)

United States Patent [19]
Bonham

[11] B1 5,271,338
[45] Certificate Issued Oct. 17, 2000

[54] TABLETOP APPARATUS AND METHOD OF CONSTRUCTION

[75] Inventor: Brent Bonham, Orem, Utah

[73] Assignee: Mity-Lite, Inc., Orem, Utah

Reexamination Request:
No. 90/005,554, Nov. 9, 1999

Reexamination Certificate for:
Patent No.: 5,271,338
Issued: Dec. 21, 1993
Appl. No.: 07/833,014
Filed: Feb. 10, 1992

[51] Int. Cl.[7] ................................... A47B 13/00
[52] U.S. Cl. ............................................. 108/161
[58] Field of Search ................ 108/161, 1, 901; 428/40.1, 500

[56] References Cited

U.S. PATENT DOCUMENTS

| | | |
|---|---|---|
| 2,802,766 | 8/1957 | Leverenz . |
| 3,091,497 | 5/1963 | Houser . |
| 4,216,993 | 8/1980 | Shumaker . |
| 4,951,576 | 8/1990 | Cobos et al. ............ 108/901 X |
| 5,123,359 | 6/1992 | DelBaso ................. 108/901 X |

*Primary Examiner*—Jose V Chen

[57] ABSTRACT

A lightweight and strong tabletop suitable for use with portable and/or collapsible tables comprises a support layer of thin laminated wood and a cover layer of ABS plastic continuously bonded to the support layer by pressing the cover layer and the support layer together with an adhesive comprising methylethylketone disposed between them. Suitable support beams are provided under the support layer, and a bottom protective layer is provided underneath the tabletop for appearance and durability. A plurality of legs support the tabletop.

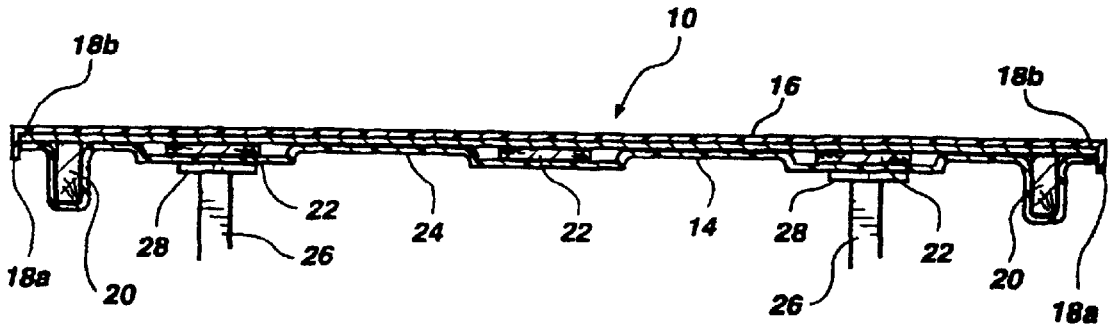

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–2 is confirmed.

* * * * *